United States Patent [19]

Takeda et al.

[11] Patent Number: 4,899,689

[45] Date of Patent: Feb. 13, 1990

[54] DEVELOPING DEVICE WITH A DEVELOPING ROLLER AND USING A SINGLE-COMPONENT DEVELOPER AND METHOD FOR PRODUCING SUCH DEVELOPING ROLLER

[75] Inventors: Fuchio Takeda; Koji Sakamoto, both of Tokyo; Kazuo Kobayashi, Kawasaki, all of Japan

[73] Assignee: Ricoh Company, Ltd., Tokyo, Japan

[21] Appl. No.: 321,374

[22] Filed: Mar. 10, 1989

[30] Foreign Application Priority Data

Mar. 10, 1988 [JP] Japan .......................... 63-56767

[51] Int. Cl.[4] .................... G03G 15/06; B21B 31/08; B60B 5/00; B41M 5/16

[52] U.S. Cl. .................................. 118/651; 29/132; 355/259; 427/145

[58] Field of Search ................ 29/132; 355/245, 259, 355/282; 118/651, 661, 653; 427/145

[56] References Cited

U.S. PATENT DOCUMENTS

| | | | |
|---|---|---|---|
| 4,382,420 | 5/1983 | Ohnuma et al. | 118/651 |
| 4,760,422 | 7/1988 | Seimiya et al. | 355/259 |
| 4,827,868 | 5/1989 | Tarumi et al. | 118/653 |

*Primary Examiner*—Fred L. Braun
*Assistant Examiner*—William Royer
*Attorney, Agent, or Firm*—Oblon, Spivak, McClelland, Maier & Neustadt

[57] ABSTRACT

A developing device including a developing roller which has a resilient support layer and a dielectric layer provided on the support layer and developing an electrostatic latent image formed on a photoconductive drum through the roller by using a single-component developer, i.e. toner. The variation of development characteristics ascribable to the developing roller is suppressed by providing a resilient material which constitutes the support layer with a resistance value less than a predetermined value that is mostly determined by a relationship between the resistance value and the developing time. Further, a method is described for producing a developing roller for the developing device.

8 Claims, 7 Drawing Sheets

R: A $4.0 \times 10^6 \Omega \cdot m^2$
B $1.0 \times 10^5 \Omega \cdot m^2$
C $1.7 \times 10^5 \Omega \cdot m^2$ q/m: A 7.8 μc/g
B 10 μc/g
C 9.2 μc/g m/a: A 0.42 mg/cm²
B 0.50 mg/cm²
C 0.39 mg/cm²

DEVELOPING DEVICE WITH A DEVELOPING ROLLER AND USING A SINGLE-COMPONENT DEVELOPER AND METHOD FOR PRODUCING SUCH DEVELOPING ROLLER

BACKGROUND OF THE INVENTION

The present invention relates to a developing device for use in an image recorder and of the type including a developing roller and using a single-component developer and, more particularly, to a developing device with an elastic developing roller for which optimal conditions associated with overall electrical characteristics have been determined. Further, the present invention is concerned with a method for producing such a developing roller.

Developing devices applicable to an electrophotographic copier, facsimile apparatus, laser printer or similar image forming apparatus may generally be classified into two types, i.e., a type using a two-component developer which consists of toner and conductive carrier and a type using a single-component developer which lacks carrier, as well known in the art. In any case, the developing device includes a developing roller and develops an electrostatic latent image formed on an image carrier in the form of a photoconductive element by supplying the developer to the latent image via the roller. The single-component type developing device, compared to the two-component type device, is attracting increasing attention because of its slow aging, small-size configuration, and low cost. Especially, various improvements in the developing roller of the single-component type developing device have been reported.

Generally, the developing roller is made up of a metal core, a support layer provided on the metal core, and a dielectric layer provided on the support layer. It has been proposed to arrange on the dielectric layer and in a position associated with the surface portion of the developing roller float electrode portions which are constituted by a number of small electrodes that are insulated from each other, as disclosed in Japanese Patent Laid-Open Publication No. 57-114163 by way of example. With this kind of scheme, a developing electrode effect particular to the carrier of a two-component developer is implemented by the number of small electrodes, i.e., by the developing roller itself to achieve desirable gradation and reproducibility.

Also proposed in relation to a developing device having the above structure is an SNSP (Soft Nonmagnetic Single-Component Development Process) which allows a field effect of the developing roller to effectively act on, among single-component developers, a non-conductive single-component developer. For this purpose, SNSP provides the developing roller with elasticity so that the roller may make contact with the photoconductive element which is rigid. To provide the developing roller with elasticity, the dielectric layer which constitutes the roller in cooperation with the metal core and support layer and, in effect, plays the role of a capacitor may be provided with a substantial thickness. From an electrical standpoint, however, the thickness of the dielectric layer has to be confined to a certain range which insures an electric field for development. It is therefore necessary to determine various conditions associated with the developing roller which would satisfy both of such contradictory requirements. In practice, electrical characteristics of the support layer and dielectric layer, such as resistance and dielectric constant, depend upon the materials of such layers and, yet, they are apt to vary with ambient temperature and humidity. Difficulty has therefore been experienced in selecting various conditions associated with the developing roller, especially optimum conditions for electrical characteristics.

As stated above, with the prior art developing device, it has been almost impracticable to provide the developing roller with elasticity while adequately matching it to the photoconductive element which is rigid, especially to adjust the developing electric field for solid images.

SUMMARY OF THE INVENTION

It is therefore an object of the present invention to provide a developing device which is operable with a single-component developer and allows a developing roller to have elasticity to stabilize the gradation of a black solid image.

It is another object of the present invention to provide a generally improved developing device with a developing roller and using a single-component developer.

It is another object of the present invention to provide a method for producing a developing roller for a developing device which is operable with a single-component developer to stabilize the gradation of a black solid image.

In accordance with the present invention, in a developing device comprising a developing roller which has at least a dielectric layer provided on a resilient support layer and developing an electrostatic latent image formed on a photoconductive drum through the developing roller by using a single-component developer which is constituted by toner, a resistance component is provided in parallel with a capacitor component of the support layer of the developing roller, a resistance value of the resistance component being determined to satisfy a condition:

$$\frac{M(Td)}{M(\infty)} \geqq 0.8$$

where M(Td) is an amount of toner deposition M on the photoconductive drum occuring when t=Td in an equation (eq. 22) and determined by an equation (eq. 21), $M(\infty)$ is an amount of toner deposition M on the photoconductive drum under a saturated condition which is determined by the equation (eq. 21), a time Td is determined by an equation (eq. 13), and a contact width $H_0$ of the photoconductive drum and developing roller which is included in the equation (eq. 13) is determined by an equation (eq. 2).

In accordance with the present invention, a method is provided for producing a resilient support layer for a developing roller of a developing device, the developing roller comprising at least the support layer and a dielectric layer provided thereon, the developing device being adapted to develop an electrostatic latent image formed on a photoconductive drum through the developing roller by using a single-component developer which is constituted by toner, the method comprising the following steps: determining a contact width $H_0$ of the photoconductive drum and the developing roller from an equation (eq. 2); determining a time Td from an equation (eq. 13) using the contact width $H_0$; determining an amount $M(\infty)$ of toner deposition on the photoconductive drum under a saturated condition from an equation (eq. 21); determining an amount M(Td) of toner deposition on the photoconductive drum occurring when a time t=Td, from an equation (eq. 22); while adjusting a resistance value of a resistance component provided in parallel with a capacitor component of the support layer such that the following condition is satisfied:

$$\frac{M(Td)}{M(\infty)} \geqq 0.8$$

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
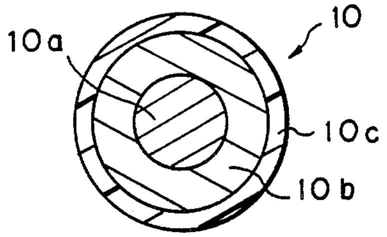
FIG. 1 is a cross-section view of a developing roller included in a developing device in accordance with the present invention.

Referring now to the drawings, wherein like reference numerals designate identical or corresponding parts throughout the several views, and more particularly to FIG. 1 thereof, a developing roller for use with a developing device embodying the present invention is shown and generally designated by the reference numeral 10. As shown, the developing roller 10 is made up of a metal core 10*a*, a support layer 10*b* provided on the metal core 10*a*, and a dielectric layer 10*c* provided on the support layer 10*b*. The support layer 10*b* is implemented by an elastic material having electric resistance. Elasticity required of the roller 10 for development, models of electrical characteristics of the roller 10, and their experimental results will be discussed hereinafter.

The relevant models of electrical characteristics are as follows:

(1) Hertz's model relating to the deformation of an elastic material;

(2) Transient phenomenon model for determining a current for development;

(3) Continuous conditional formula associated with the supply and consumption of toner; and (4) Conditional formula of potential balance for determining the amount of distribution of toner to an image carrier in the form of a photoconductive element.

Among the above factors, the model (1) may be analyzed as a model of dynamic contact. Specifically, with the previously mentioned SNSP scheme when the developing roller in the worst case is spaced apart from the photoconductive element by a predetermined distance, an area that cannot be developed is produced. Conversely, when the contact pressure of the developing roller against the photoconductive element is excessively high, the driving torque increases. The variation of the contact pressure in turn changes the width over which the roller and photoconductive element make contact, so that the developing characteristics vary with developing time. It is therefore necessary to confine the contact condition between the roller and the photoconductive element in a particular range.

Figure 2A:
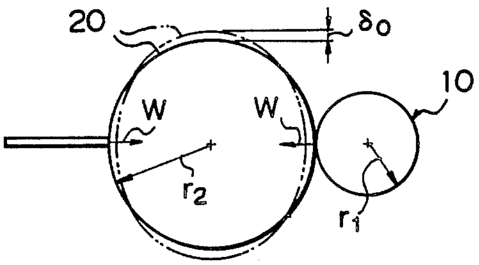
FIGS. 2A and 2B are schematic diagrams useful for understanding dynamic factors associated with the developing roller of FIG. 1 and with a photoconductive element.
Figure 2B:
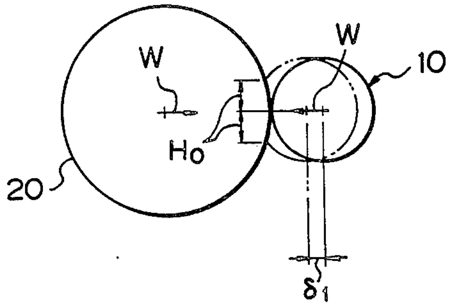

FIGS. 2A and 2B illustrate a photoconductive element in the form of a drum 20 and the developing roller 10 which are held in contact with each other. More specifically, FIG. 2A shows, among deformation patterns of the drum 20 and roller 10, a pattern of overall deformation (amount of $\delta_0$) of the drum 20 which was determined with a bent beam model. FIG. 2B is indicative of a contact width of $2H_0$ ascribable to the partial deformation (amount of $\delta_1$) of the roller 10. The total deformation $\delta_0$ of the drum 20 is produced by:

$$\delta_0 = \frac{0.149 \cdot W \cdot r_2^3}{2 \cdot E \cdot I} \tag{1}$$

The contact width $2H_0$ is producing by using Hertz's formula, as follows:

$$H_0 = \mathrm{SQRT}\left(\frac{4 \cdot W}{\pi L} \cdot \left(\frac{1-\nu_1^2}{E_1} + \frac{1-\nu_2^2}{E_2}\right) \cdot \frac{r_1 \cdot r_2}{r_1 + r_2}\right) \tag{2}$$

In the equations (1) and (2), E, $E_1$ and $E_2$ are Young's moduli, I is a moment of inertia or area, $\nu$, $\nu_1$ and $\nu_2$ are Poisson's ratios, L is the length of the contact portion, W is the total amount of forces acting on the drum 20 and roller 10, and $r_1$ and $r_2$ are the radii of the roller and drum 10, respectively.

Concerning the previously mentioned model (2), we made the following assumptions to create an equivalent circuit model for development:

(a) Electrical characteristics of the material constituting the developing roller 10, i.e., those of the laminated layers of the roller 10 are linear;

(b) Toner is applied to the roller 10 as a thin layer and deposited with a charge of Qt;

(c) The roller 10 is made up of the dielectric layer 10*c* and the support layer 10*b* which underlies the dielectric layer 10*c;*

(d) A charge $Qt_0$ opposite in polarity to the charge of the toner is deposited on the surface of the roller 10;

(e) The interval between charging of the toner and development is sufficiently long and allows a charge of $-(Qt+Qt_0)$ to be applied to the boundary between the dielectric layer 10*c* and the support layer 10*b* of the roller 10; and (f) While the drum 20 and the roller 10 contact each other over a predetermined width and with a linear velocity ratio, toner receives an additional charge of $\Delta Qt$ due to its friction with the drum 20.

Assume that at a time $t=0$ the leading edge of a solid image enters a developing area and the development begins. Further, assume that the charge $(Qt+\Delta Qt)$ of the toner is located at the center of the toner layer, and that the toner layer constitutes two capacitors which are interconnected at the center of the toner.

The toner deposition on the drum 20 may be considered to occur in two consecutive steps. First, the developing process will be formulated. With respect to the equivalent circuit of FIG. 3, simultaneous differential equations may be set up as follows:

$$\frac{d}{dt}Q_0(t)=\frac{d}{dt}Q_1(t) \tag{3}$$

$$\frac{d}{dt}Q_1(t)=\frac{d}{dt}Q_2(t) \tag{4}$$

$$\frac{d}{dt}Q_2(t)=\frac{d}{dt}Q_3(t) \tag{5}$$

$$\frac{d}{dt}Q_3(t)=\frac{d}{dt}Q_4(t)+\frac{d}{dt}Q_5(t) \tag{6}$$

Figure 3:
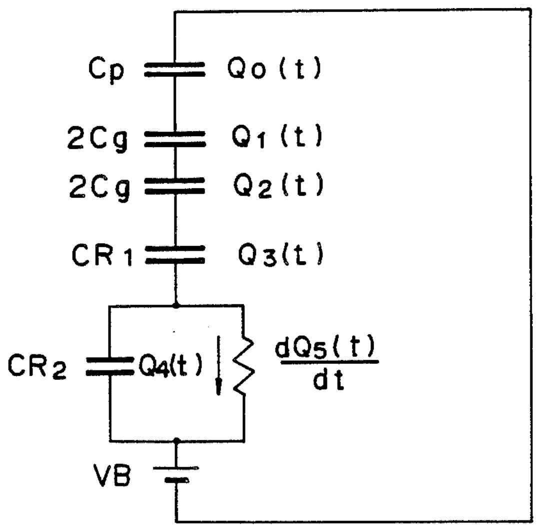
FIG. 3 is a diagram schematically showing an equivalent circuit of a model of the developing device in accordance with the present invention.

In FIG. 3 and the above equations (3) to (6), Cp is the electrostatic capacity of a capacitor which corresponds to the drum 20, Cg is the electrostatic capacity of a capacitor corresponding to the toner layer, $CR_1$ is the electrostatic capacity of a capacitor corresponding to the dielectric layer 10*c*, $CR_2$ is the electrostatic capacity of a capacitor corresponding to the support layer 10*b*, VB is a bias voltage, $Q_0(t)$ to $Q_4(t)$ are charges individually deposited on the capacitors, and $dQ_5(t)/dt$ is a current flowing through the support layer or resistance layer 10*b*. By solving the above equations under the initial conditions of equations (7) to (10), presented below, and the potential balancing condition represented by equations (11) and (12) also presented below, the charge deposited on the toner layer upon the lapse of T seconds after the start of development is produced. A time Td is produced by an equation (13) which will follow by using $H_0$ of the equation (2). It is to be noted that R in the equation (12) denotes resistance of the dielectric layer 10*b* and V in the equation (13) denotes velocity.

$$-Q_0(0)+Q_1(0)=Qp-\Delta Qt \tag{7}$$

$$-Q_1(0)+Q_2(0)=Qp+\Delta Qt \tag{8}$$

$$-Q_2(0)+Q_3(0)=Qt_0 \tag{9}$$

$$-Q_3(0)+Q_4(0)=-Qt-Qt_0 \tag{10}$$

$$\frac{Q_0(t)}{Cp}+\frac{Q_1(t)}{2Cg}+\frac{Q_2(t)}{2Cg}+\frac{Q_3(t)}{2CR_1}+\frac{Q_4(t)}{CR_2}+VB=0 \tag{11}$$

$$\frac{Q_4(t)}{CR_2}=R\frac{d}{dt}Q_5(t) \tag{12}$$

$$Td=\frac{2\cdot H_0}{V} \tag{13}$$

Figure 4:
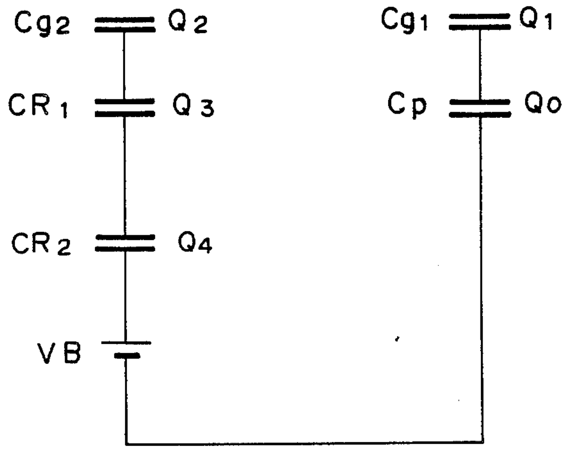
FIG. 4 is a schematic diagram of an equivalent circuit representative of a field condition which occurs while toner is separated from the developing roller.

Second, the separation of the toner layer from the developing roller 10 is assumed to occur instantaneously in a portion of the toner layer where the electric field is zero, and the equivalent circuit for the separation is shown in FIG. 4. From the equivalent circuit of FIG. 4, the following equations are derived:

$$Q_0-Q_1=Qp-\Delta Qt \tag{14}$$

$$Q_1=(Qt+\Delta Qt-Q_2)\times N \tag{15}$$

$$-Q_2+Q_3=Qt_0 \tag{16}$$

$$-Q_3+Q_4=Qr \tag{17}$$

$$\frac{Q_0}{Cp}+\frac{Q_1}{Cg}=VB+\frac{Q_4}{CR_2}+\frac{Q_3}{CR_1}+\frac{Q_2}{Cg} \tag{18}$$

Let an equation (19) which is shown below hold with respect to the density of toner charge on the drum 10 and that of remaining charge on the roller 10, each at a linear velocity ratio of N, and the density of toner charge on the roller 10, $$\frac{Q/a}{N}+q'/a=q/a \tag{19}$$

where Q/a is the charge to the area ratio of the toner on the drum 20, q'/a is the charge to the area ratio of toner left on the roller 10, and q/a is the charge to the area ratio of toner in the contact area. The above equation (19) is a modified version of the continuous equations associated with current.

The potential balancing condition at the separating point is produced by:

$$\frac{Q_0}{Cp}+\frac{Q_1}{Cg_1}=VB+\frac{Q_4}{CR_2}+\frac{Q_3}{CR_1}+\frac{Q_2}{Cg_2} \tag{20}$$

where Cg1 and Cg2 are capacitances of the toner layer calculated in accordance with a position where the toner layer is separated into two portions, i.e., from the developing roller 10 to the drum 20. In more detail, Cg1 is capacitance between the separating position and the surface of the drum 10, and Cg2 is capacitance between the separating position and the surface of the developing roller 10.

With the above preparatory steps, the amount of toner deposition M on the drum 20 is expressed as:

$$M=\frac{(Qt+\Delta Qt)\cdot Cg\cdot N^2}{N^2-1}\cdot \tag{21}$$

$$\left\{-\left(\frac{1}{Cp}+\frac{1}{N\cdot CR_1}+\frac{1}{N\cdot Cg}+\frac{1}{N\cdot CR_2}\right)+\right.$$

$$\text{SQRT}\left[\left(\frac{1}{Cp}+\frac{1}{N\cdot Cg}+\frac{1}{N\cdot CR_1}+\frac{1}{N\cdot CR_2}\right)^2-\right.$$

$$\frac{2\cdot(N^2-1)}{(Qt+\Delta Qt)\cdot Cg\cdot N}+\left(\frac{Qp-\Delta Qt}{Cp}-\frac{Qt+\Delta Qt}{2\cdot Cg}-\right.$$

-continued $$\left.\left.\left.\frac{Qt + Qt_0 + \Delta Qt}{CR_1} - \frac{Qt + Qt_0 + \Delta Qt + Qr}{CR_2}\right) - VB\right)\right]\right\} \cdot \frac{1}{q/m}$$

where q/m is the charge to the amount of toner in the contact area.

Qr included in the equation (21) is produced by:

$$Qr = \frac{\frac{Qp}{Cp} + \frac{\Delta Qt - Qt}{2 \cdot Cg} - \frac{Qt + Qt_0}{CR_2} - VB}{\frac{1}{Cp} + \frac{1}{Cg} + \frac{1}{CR_2}} \tag{22}$$

$$X \operatorname{Exp}\left( - \frac{\frac{1}{Cp} + \frac{1}{Cg} + \frac{1}{CR_2}}{R \cdot CR_2\left(\frac{1}{Cp} + \frac{1}{Cg} + \frac{1}{CR_1} + \frac{1}{CR_2}\right)} \cdot t \right) - \frac{\frac{Qp + Qt + Qt_0}{Cp} + \frac{Qt + 2 \cdot Qt_0 + \Delta Qt}{2 \cdot Cg} - VB}{\frac{1}{Cp} + \frac{1}{Cg} + \frac{1}{CR_2}}$$

where R is resistance of the support layer 10*b*.

The deformation $\delta_1$ of the developing roller 10 and developing time will be discussed hereinafter.

Figure 5A:
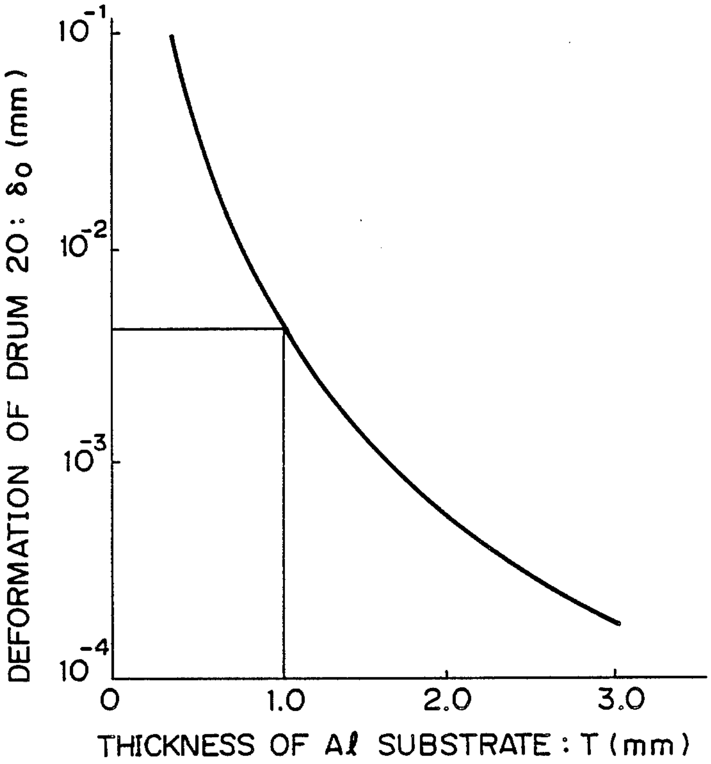
FIGS. 5A to 5C are graphs explanatory of developing time and various dynamic variations which are observed in the developing roller and have influence on developing time.

FIG. 5A shows a curve representative of the overall deformation $\delta_0$ of the drum 20 with respect to the thickness T of an aluminum substrate (not shown) which forms a part of the drum 20. In FIG. 5A, the ordinate and the abscissa indicate the deformation (mm) $\delta_0$ and the thickness T(mm), respectively. Assume that the drum 20 is implemented with substantially 1 mm thick aluminum substrate, which is a typical dimension, and has a length L of substantially 210 mm, and the load W is 1 kgf. Then, the deformation $\delta_0$ of the drum 20 is several μm and is therefore ignored.

Figure 5B:
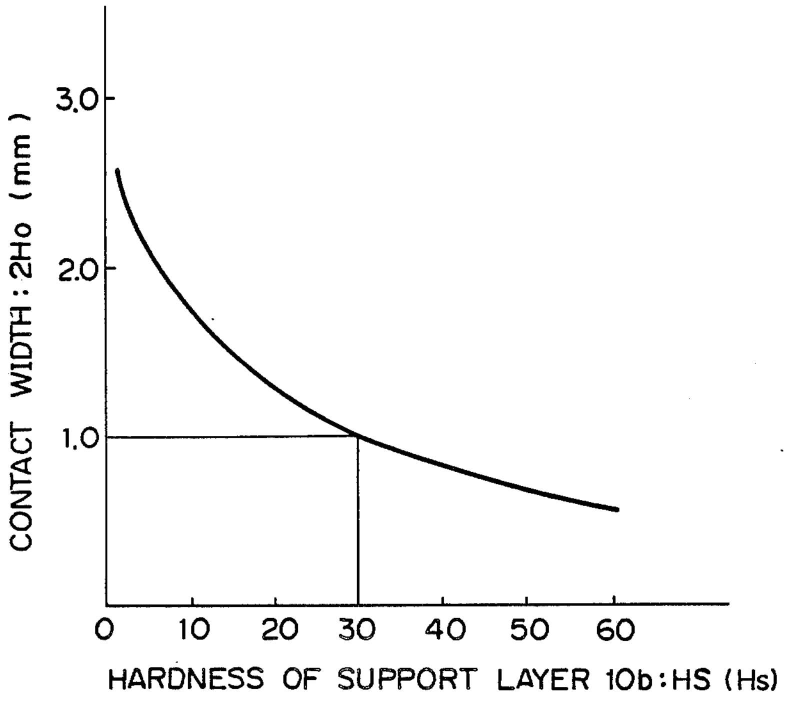

FIG. 5B shows a relatinship between the hardness HS of the resilient support layer 10*b* and the contact width $2H_0$ of the developing roller 10. In FIG. 5B, the ordinate and the abscissa are respectively representative of the contact width $2H_0$ (mm) and the hardness HS (Hs), and the roller length L and the load W are respectively assumed to be 210 mm and 1 kgf. Assuming that a contact width of 1 mm is achievable with a contact force of 1 kgf, then it will be seen that the hardness HS of the support layer 10*b* should have a rubber hardness of substantially 30°. The variation of the contact force is assumed to be ±400 gf.

Figure 5C:
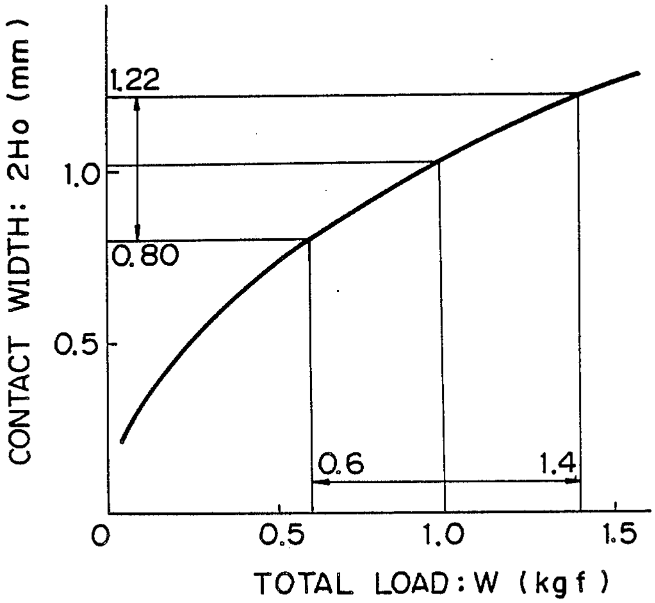

Further, FIG. 5C shows a relationship between the contact width $2H_0$ (mm) as measured on the roller 10 and the contact force or load W (kgf) exerted by the roller 10 on the drum 20; the former is indicated by the ordinate and the latter is indicated by the abscissa. The contact width $2H_0$ of the roller 10 is variable over a range of 0.80 mm to 1.22 mm. When divided by 75 mm/sec which is a set linear velocity of the roller 10, the variation of the contact width $2H_0$ is 10 msec to 16 msec in terms of developing time.

Figure 6:
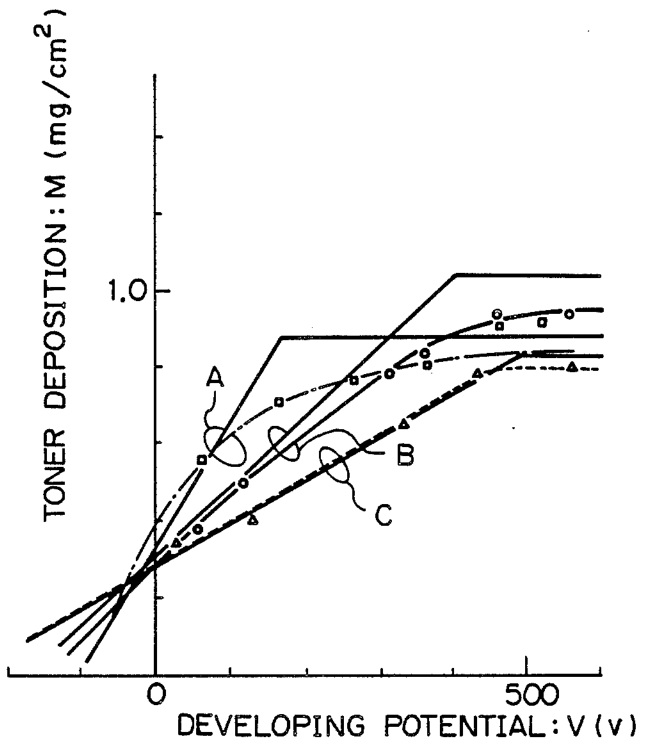
FIG. 6 is a graph showing a relationship between the amount of developer and developing potential which are factors for determining developing characteristics.

Development characteristics are determined by using the equation (21). FIG. 6 shows the calculated results of such characteristics and their experimental results in terms of a relationship between the potential V (volt) for development and the amount of toner or developer M (mg/cm²). As shown in FIG. 6, the variation of development sufficiently conforms to the variation of resistance R (Ω.cm) of the elastic materials A, B and C. It is therefore possible to make simulation of development characteristics. It follows that the variation of development characteristics caused by the variation of resistance can be reduced by reducing the resistance of the elastic layer which forms the support layer of the roller 10. Therefore, in order to suppress the variation of development characteristics ascribable to the variation of developing time, the resistance R of the support layer 10*b* should be set less than a predetermined value which is determined by the relation with developing time.

Figure 7:
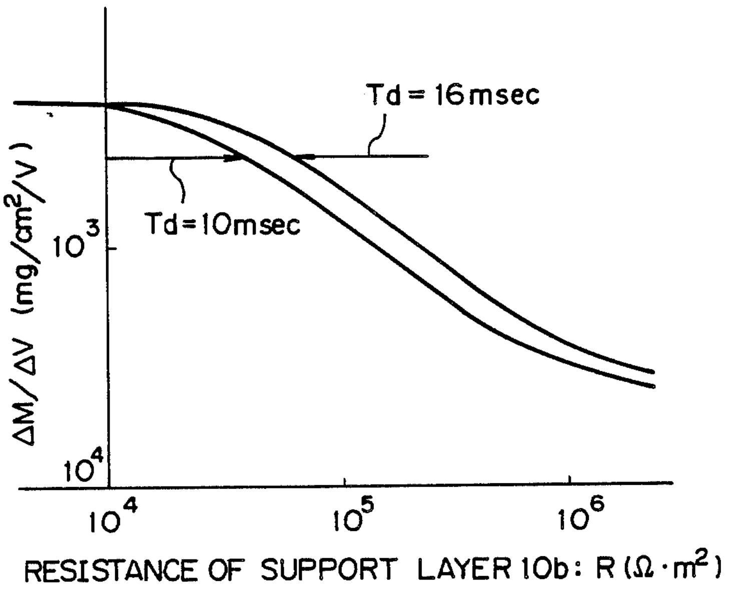
FIG. 7 is a graph illustrating a relationship between the developing characteristics and the resistance of an elastic layer which is incuded in the developing roller.

Under these conditions, if the resistance R of the support layer 10*b* that gives the saturation over 80%, preferably over 90%, of curve of the inclination of development characteristic curve is defined, a value less that $2\times10^4$ Ω.cm has to be chosen, as seen from FIG. 7.

More specifically, in order that the resistance R of the support layer 10*b* may be so determined as to cause the amount of toner deposition M(Td) on the drum 20 as expressed by the equation (21) to be more than 80%, preferably more than 90%, of the toner deposition M (∞) under saturation, the following relation should hold:

$$\frac{M\,(Td)}{M\,(\infty)} \geq 0.8 \tag{23}$$

The toner deposition M(Td) is the value of M occurring when t=Td and produced by the equation (22), while the toner deposition M (∞) under saturation is the value of M occurring when t=∞ and produced by the equation (21). The time Td is determined by the equation (13), and the contact width $2H_0$ of the equation (13) is determined by the equation (2).

Further, the resistance R of the support layer 10*b* varies with the ambient conditions in which the developing roller 10 is used, especially temperature and humidity. To maintain the variation of the toner deposition M expressed by the equation (21) less than 20%, preferably less than 10%, despite such a variation of the resistance R, there should hold a relation:

$$\frac{M(R,\ \max) - M(R,\ \min)}{M\,(R,\ \max)} \leq 0.3 \tag{24}$$

The toner deposition M (Rmax) is the value of M which holds when the resistance R of the equation (22) becomes maximum due to variations of temperature and humidity and determined by the equation (21). The toner deposition M (Rmin), on the other hand, is the value of M which holds when the resistance R becomes minimum and is determined by the equation (21).

As stated above, the contact width $2H_0$ of the developing roller 10 and drum 20 is determined by the contact force exerted by the roller 10 on the drum 20 and the rubber hardness of the support layer 10*b* of the roller 10. Developing time is determined by the contact width $2H_0$ and the linear velocity of development. Under these mechanical conditions, the development characteristics can be calculated by using the electrical characteristics of the roller 10, the charge deposited on toner, etc.

In the illustrative embodiment, the resistance of the support layer 10*b* of the roller 10 is selected to be of the order of the fourth power of 10.

Further, in the model shown and described, a current for development which flows before the developing roller 10 makes contact with the latent image on the drum 20 is assumed to make little contribution to the development and is therefore ignored. Also ignored is the non-linearity of material characteristics under intense electric fields.

In summary, it will be seen that the present invention offers stable development characteristics by introducing a resistance component in a capacitor, which corresponds to a support member of a developing roller, in parallel with the latter and determining the value of the resistance component.

Further, in accordance with the present invention, the SNSP system using a resilient roller can be adopted simply by determining the resistance of the support layer of the roller. This allows the roller implemented by the SNSP system to be adequately matched to a photoconductive element which is rigid and thereby realizes an optimal gradation characteristic with such a system.

Obviously, numerous modifications and variations of the present invention are possible in light of the above teachings. It is therefore to be understood that within the scope of the appended claims, the invention may be practiced otherwise than as specifically described herein.

What is claimed is:

1. In a developing device comprising a developing roller which has at least a dielectric layer provided on a resilient support layer and developing an electrostatic latent image formed on a photoconductive drum through said developing roller by using a single-component developer which is constituted by toner, a resistance component is provided in parallel with a capacitor component of said support layer of said developing roller, a resistance value R of said resistance component being determined to satisfy a condition:

$$\frac{M(Td)}{M(\infty)} \geqq 0.8$$

where M(Td) is an amount of toner deposition M on said photoconductive drum occurring when t=Td in an equation (eq. 22) and determined by an equation (eq. 21), $M(\infty)$ is an amount of toner deposition M on said photoconductive drum under a saturated condition which is determined by the equation (eq. 21), a time Td is determined by an equation (eq. 13), and a contact width $H_0$ of said photoconductive drum and said developing roller which is included in the equation (eq. 13) is determined by an equation (eq. 2).

2. A developing device as claimed in claim 1, in which the following condition is satisfied for variations of ambient conditions in which said developing roller (10) is used:

$$\frac{M(R,\ \max) - M(R,\ \min)}{M(R,\ \max)} \leqq 0.3$$

where M(R, max) is an amount of tone deposition occurring when resistance R of the equation (eq. 22) becomes maximum due to variations of the ambient conditions and determined by the equation (eq. 21), and M(R, min) is an amount of toner deposition occurring when the resistance R becomes minimum due to variations of the ambient conditions and determined by the equation (eq. 21).

3. A developing device as claimed in claim 1, in which said resistance R is in the order of $10^4$ Ωcm.

4. A developing device as claimed in claim 2, in which said resistance R is in the order of $10^4$ Ωcm.

5. A method for producing a resilient support layer for a developing roller of a developing device, said developing roller comprising at least said support layer and a dielectric layer provided thereon, said developing device being adapted to develop an electrostatic latent image formed on a photoconductive drum through said developing roller by using a single-component developer which is constituted by toner, said method comprising steps of:

(a) determining a contact width $H_0$ of said photoconductive drum and said developing roller from an equation (eq. 2);

(b) determining a time Td from an equation (eq. 13) using said contact width $H_0$;

(c. 1) determining an amount $M(\infty)$ of toner deposition on said photoconductive drum under a saturated condition from an equation (eq. 21);

(c. 2) determining an amount M(Td) of toner deposition on said photoconductive drum occurring when a time t=Td, from an equation (eq. 22); and (c. 3) while adjusting a resistance R of a resistance component provided in parallel with a capacitor component $CR_2$ of said support layer such that the following condition is satisfied:

$$\frac{M(Td)}{M(\infty)} \geqq 0.8$$

6. A method as claimed in claim 5, in which the following condition is satisfied for variations of ambient conditions in which said developing roller is used:

$$\frac{M(R,\ \max) - M(R,\ \min)}{M(R,\ \max)} \leqq 0.3$$

where M(R, max) is an amount of toner deposition occurring when the resistance R of the equation (eq. 22) becomes maximum due to variations of the ambient conditions and determined by the equation (eq. 21), and M(R, min) is an amount of toner deposition occurring when the resistance R becomes minimum due to variations of the ambient conditions and determined by the equation (eq. 21).

7. A method as claimed in claim 5, in which said resistance R is adjusted to have a value in the order of $10^4$ Ωcm.

8. A method as claimed in claim 6, in which said resistance R is adjusted to have a value in the order of $10^4$ Ωcm.

* * * * *